United States Patent
Cho

(10) Patent No.: US 8,040,262 B2
(45) Date of Patent: *Oct. 18, 2011

(54) METHOD AND APPARATUS FOR ENCODING/DECODING METADATA

(75) Inventor: Kyung-sun Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/829,502

(22) Filed: Jul. 2, 2010

(65) Prior Publication Data

US 2010/0268718 A1    Oct. 21, 2010

Related U.S. Application Data

(63) Continuation of application No. 12/167,591, filed on Jul. 3, 2008, now Pat. No. 7,772,998.

(30) Foreign Application Priority Data

Aug. 13, 2007   (KR) .................. 10-2007-0081440

(51) Int. Cl.
*H03M 7/00*    (2006.01)

(52) U.S. Cl. ............................................. 341/50; 341/51
(58) Field of Classification Search ............... 341/50–51
See application file for complete search history.

(56) References Cited

U.S. PATENT DOCUMENTS

| 2005/0223034 A1* | 10/2005 | Kaneko et al. ............ 707/104.1 |
| 2005/0234731 A1 | 10/2005 | Sirivara et al. |
| 2005/0289601 A1* | 12/2005 | Park et al. ....................... 725/54 |

FOREIGN PATENT DOCUMENTS

| KR | 10-2004-0055556 A | 6/2004 |
| WO | 2006041260 A1 | 4/2006 |
| WO | 2007/029918 A1 | 3/2007 |

* cited by examiner

*Primary Examiner* — Khai M Nguyen
*(74) Attorney, Agent, or Firm* — Sughrue Mion, PLLC

(57) ABSTRACT

Provided are a meta data encoding/decoding method and apparatus. The meta data decoding method includes decoding a media signal containing a media object, and decoding meta data corresponding to the media object. During the decoding of the meta data signal, decoding of the meta data is skipped when the meta data that is to be decoded is identical to already decoded meta data.

2 Claims, 10 Drawing Sheets

METHOD AND APPARATUS FOR ENCODING/DECODING METADATA

CROSS-REFERENCE TO RELATED PATENT APPLICATIONS

This is a Continuation Application of application Ser. No. 12/167,591, filed Jul. 3, 2008, which claims the benefit of Korean Patent Application No. 10-2007-0081440, filed on Aug. 13, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to data encoding and decoding, and more particularly, to a method and apparatus for efficiently encoding/decoding metadata and a recording medium thereof.

2. Description of the Related Art

Advances in multimedia technologies has triggered development of methods of satisfying users' various demands for multimedia contents. Meta data is used to quickly and precisely search for desired data out of a large amount of multimedia data. The meta data is allocated to content according to predetermined rules, and contains various information, such as the location and the details of the content, the details of a content producer, right conditions, usage conditions, and usage history. The meta data is used in order to represent data and fast search for data.

SUMMARY OF THE INVENTION

The present invention provides an encoding/decoding method and apparatus capable of determining whether meta data has been updated or whether meta data is not changed without decoding the meta data.

The present invention also provides an encoding method and apparatus for determining whether meta data has been updated or whether meta data is not changed by using either a cycle of inserting a meta data packet into a transmission stream or unique location information of the meta data.

The present invention also provides a decoding method and apparatus for determining whether meta data has been updated or whether meta data is not changed by using either a cycle of inserting a meta data packet into a transmission stream or unique location information of the meta data.

The present invention also provides an encoding/decoding method and apparatus and a data structure for preventing the same meta data from being repeatedly decoded by determining whether the meta data has been updated or whether the meta data is not changed, and a computer readable medium having recorded thereon a program for executing the method.

According to an aspect of the present invention, there is provided a method of decoding meta data, the method including decoding a media signal containing a media object; and decoding meta data corresponding to the media object, wherein if the meta data that is to be decoded is identical to already decoded meta data, the decoding of the meta data is skipped.

The decoding of meta data may include extracting location information of the corresponding meta data from the media object; and decoding the meta data having the location information by using the extracted location information. Whether the meta data that is to be decoded is identical to the already decoded meta data may be determined by comparing the extracted location information with location information of the already decoded meta data, and the location information of the meta data may be a unique identifier of the meta data. If at least one of the media object and the meta data corresponding to the media object is changed, the location information of the meta data may also change. The meta data may include object description data, wherein the object description data contains information for decoding the media signal.

According to another aspect of the present invention, there is provided a method of decoding meta data, the method including decoding a media signal containing a media object; and decoding meta data corresponding to the media object by using location information of the meta data, which is extracted from the media object, wherein the location information is a unique identifier of the meta data.

According to another aspect of the present invention, there is provided a method of decoding meta data, the method including receiving a stream in which a media signal containing a media object and meta data corresponding to the media object are mixed together in the form of a packet; parsing the stream into the media signal and the meta data signal; and decoding the parsed media signal and meta data signal, wherein the meta data packet is inserted into the stream in a predetermined cycle, where the cycle represents whether unique version information of the meta data is updated.

During the parsing of the stream, parsing the meta data packet may be skipped when the cycle of inserting the meta data packet is identical to a previous cycle. The parsing of the stream may include performing the meta data packet when the cycle of inserting the meta data packet is not identical to a previous cycle.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Exemplary embodiments of the present invention will now be described in greater detail with reference to the accompanying drawings.

An encoding/decoding apparatus according to the present invention is capable of determining whether meta data has been updated or whether the meta data is not changed by using location information of meta data or a cycle of transmitting the meta data. Meta data contains unique version information, and a change in the version information means that the meta data has been updated. Hereinafter, if meta data has unique location information, a technique of determining whether the meta data has been updated by using the location information and a technique of indicating whether the meta data has been updated by changing a cycle of inserting a meta data packet into a meta data transmission stream, will be described.

Figure 1A:
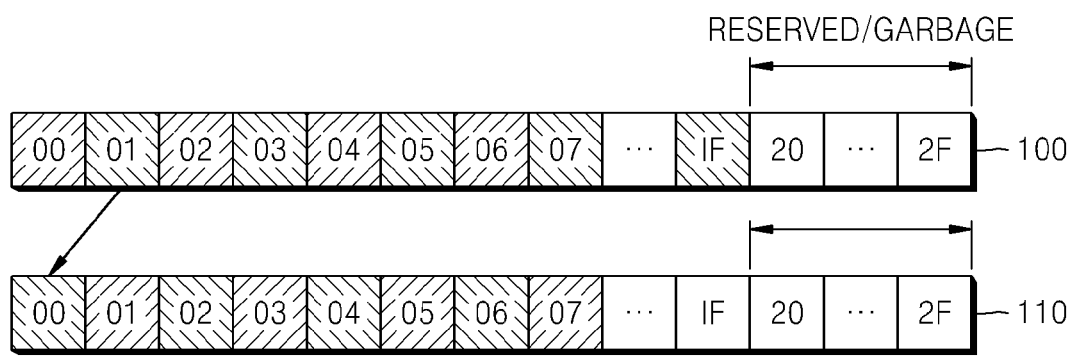
FIG. 1A is a diagram illustrating a case where the location information of meta data contained in a meta data signal is variable.
Figure 1B:
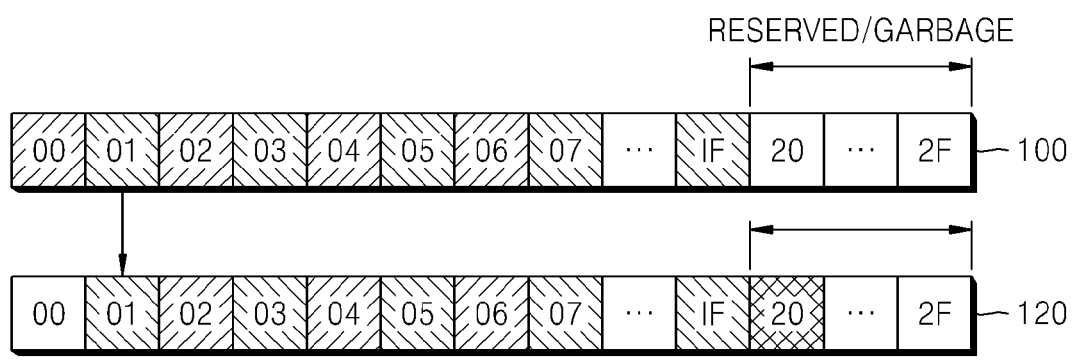
FIG. 1B is a diagram illustrating a case where the location information of meta data contained in a meta data signal is invariable, according to an embodiment of the present invention.

FIGS. 1A and 1B are drawings explaining the present invention using a meta data signal. In detail, FIG. 1A illustrates a case where the location information of meta data contained in a meta data signal is variable, and FIG. 1B illustrates the location information of meta data contained in a meta data signal is invariable according to an embodiment of the present invention.

Referring to FIGS. 1A and 1B, each of meta data signals 100, 110, and 120 contains a plurality of pieces of meta data, and the pieces of the meta data are respectively contained in specific locations of the meta data signals 100, 110, and 120. The meta data signals 100, 110, and 120 may include an area for storing undefined meta data, which will now be referred to as a reserved area or a garbage area for convenience.

In the case of FIG. 1A, the locations of the pieces of the meta data contained in the meta data signal 100 are variable, i.e., can change. The movement of each piece of the meta data also changes the location information thereof. It is assumed that the meta data contained in a leftmost location 00 of the meta data signal 100 has been canceled because the meta data has been lost or damaged. In this case, the locations of the remaining meta data in the meta data signal 100 shift by one in the left direction since the location 00 is empty. Thus the meta data as originally being contained in a location 01 shifts to the location 00, and the location information thereof changes from '01' to '00'. Referring to FIG. 1A, the meta data signal 110 is obtained when the locations of the pieces of the meta data shift by one in the left direction. Since the locations of the meta data are variable, it is not guaranteed that the location of meta data stored at a specific instant of time is maintained at another instant of time and that the same location information represents the same meta data.

In the case of FIG. 1B, each of a plurality of pieces of meta data contained in the meta data signal 100 has unique location information. Thus unless the pieces of the meta data are not changed or deformed, their location information is not changed. As in the above example, it is assumed that the meta data contained in a leftmost location 00 of the meta data signal 100 has been deleted. In this case, the locations of the other pieces of the meta data in the meta data signal 100 do not shift even if the location 00 is empty. Thus even if some of the pieces of the meta data in the meta data signal 100 are lost, the unique location information of the remaining pieces of the meta data in a meta data signal 120 is maintained. That is, the location information of the meta data functions as an identifier thereof, and thus the same location information of the meta data represents the same meta data.

A change in a media signal results in a change in meta data corresponding to the media signal. If meta data is changed due to a change in the media signal or irrespective of the media signal, the changed meta data is not the same as the original meta data and thus the location information of the changed meta data also changes. If it is assumed that meta data in a location 00 is changed as illustrated in FIG. 1B, the location of the changed meta data is also changed. In this case, the changed meta data may be contained in a reserved/garbage area. Referring to FIG. 1B, the meta data in the location 00 is changed and then shifts to a location 20 in a reserved/garbage area.

Hereinafter, various embodiments of the present invention when the location information of meta data functions as an identifier thereof as illustrated in FIG. 1B, will now be described in detail.

Figure 2:
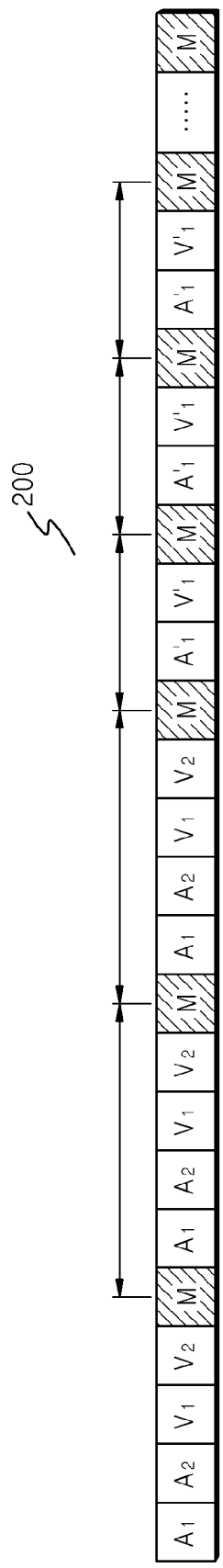
FIG. 2 is a diagram illustrating the structure of a meta data transmission stream according to an embodiment of the present invention.

FIG. 2 illustrates the structure of a meta data transmission stream 200 according to an embodiment of the present invention. Referring to FIG. 2, in the meta data transmission stream 200, a plurality of media objects contained in a media signal and a plurality of pieces of meta data contained in a meta data signal are mixed together in the form of a packet. Referring to FIG. 2, audio packets, video packet, and meta data packets contained in the meta data transmission stream 200 are respectively indicated with "A", "V", and "M". An encoding apparatus (not shown) generates and encodes the media signal and the meta data signal, and then transforms them in the form of a packet. In this case, the meta data contained in the meta data signal is packed in a section structure and then is divided into units of packets. Version information is allocated to the section of each piece of the meta data. If a change in version information results in a change in the attributes of the meta data, and thus the version information functions as a unique identifier of the meta data. According to the present invention, a decoding apparatus (not shown) is capable of determining whether the meta data has been updated, using the version information. To this end, the encoding apparatus can indicate whether the version information of the meta data is not changed, using a cycle of mixing a meta data packet. That is, a multiplexer (not shown) of the encoding apparatus can determine a ratio at which audio packets, video packets, and meta data packet are mixed to form a stream. The multiplexer may insert the meta data packets into the stream in a first cycle if the version of the meta data is not changed, and the meta data packets into the stream in a second cycle if the version of the meta data is changed, that is, if the meta data is updated. Referring to FIG. 2, the encoding apparatus sequentially inserts two audio packets, two video packets, and a meta data packet into a stream, and then sequentially inserts an audio packet, a video packet, and a meta data packet in to the stream in order to indicate that the meta data is updated. The encoding apparatus changes a cycle of inserting the meta data according to the version information thereof, inserts the meta data in the changed cycle, and then transmits the stream containing the meta data to the decoding apparatus.

Figure 3:
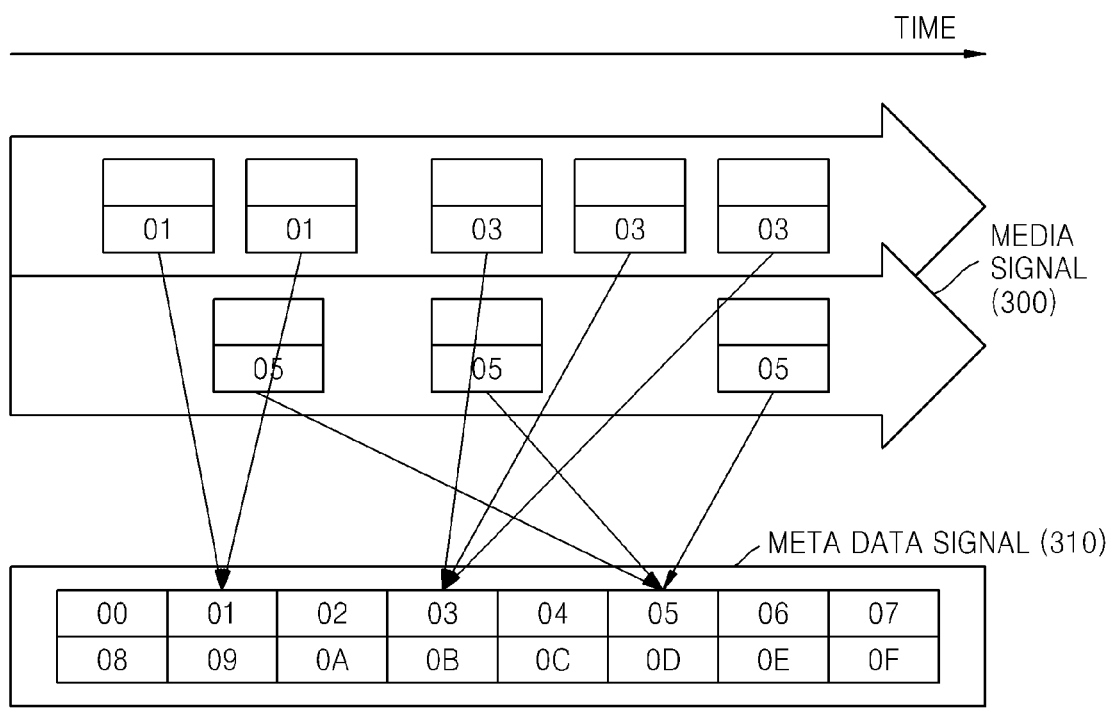
FIG. 3 illustrates a media meta data framework according to an embodiment of the present invention.

FIG. 3 illustrates a media meta data framework according to an embodiment of the present invention. Referring to FIG. 3, the media meta data framework includes a media signal 300 and a meta data signal 310. The media meta data framework is obtained by composing meta data based on media objects. If contents are managed based on a meta data stream, it is difficult to change or capture some media objects from among the contents since meta data is composed in units of scenes, and damage to the meta data stream prevents scene composition during content streaming. Thus meta data is preferably composed based on media objects contained in a media signal. If meta data is composed based on media objects, each of the media objects contains information necessary for accessing the meta data, e.g., the location information of the meta data. The media objects can access meta data corresponding to the respective media objects by using the location information of the meta data.

The media signal 300 may contain an audio signal, a video signal, or an image signal, and a plurality of media objects. Each media object contains an audio frame, a video frame or an image frame for each media signal. Also, each media object has corresponding meta data, and unique location information of the corresponding meta data.

The meta data signal 310 contains a plurality of pieces of meta data. The meta data contains information regarding the media objects, or signs, characters or marks, which are defined for object processing and used to perform particular functions. The meta data signal 310 may further include object description data containing various profile information, such as information for decoding the media object, and media handling data containing information regarding a rendering location of the media objects or regarding transforming the media objects.

Each of the media objects may contain location information of the meta data, such as object description data, or media handling data which corresponds to each media object, such as location information of the meta data. Referring to FIG. 3, a number is allocated to each of the media objects in the media signal 300. The allocated number may be used as version information of the corresponding meta data or in order to indicate the location of the meta data. Each piece of the meta data has unique version information, and particularly has unique location information according to the present invention. Thus, the version information and the location information have one to one correspondence to each other, and may be the same according to circumstances.

A decoding apparatus (not shown) can easily access meta data corresponding to the respective media objects by using the location information of the meta data. The pieces of the meta data contained in the meta data signal 310 are arranged according to the unique location information thereof.

The decoding apparatus decodes from the leftmost media object in the media signal 300 to the rightmost media object. In detail, the decoding apparatus first decodes the leftmost media object, and extracts location information 01 of the meta data from the decoded media object. The decoding apparatus accesses the meta data at a location corresponding to the location information 01 by using the extracted location information. As described above, according to the present invention, the location information of the respective pieces of the meta data respectively identify the pieces of the meta data. That is, the location information can be used as a unique identifier of the meta data.

The decoding apparatus can reproduce the media signal 300 by using the meta data for the media objects. A user can use the media signal 300 from a beginning or middle part thereof. Thus, while reproducing a media object having specific attributes, the decoding apparatus must repeatedly decode meta data corresponding to an identical media object. If media objects have the same attributes, meta data corresponding to the media objects are also the same. That is, the media objects have the same additional information, such as decoding type, rendering information, or title information thereof. Thus once decoding of the meta data for the media object having specific attributes is completed, it is not necessary to repeatedly decode the meta data for an identical media object having the same attributes. According to the present invention, the decoding apparatus can determine whether meta data that is to be decoded is identical to already decoded meta data by using unique location information for each piece of meta data.

Next the decoding apparatus decodes a second media object contained in the media signal 300, and extracts location information 01 of the meta data from the second media object. Then the decoding apparatus determines whether the extracted location information 01 is identical to the previously extracted location information 01. The decoding apparatus does not access and decode the meta data at a location corresponding to the location information 01 since the extracted location information 01 is identical to the previously extracted location information 01. That is, the already decoded meta data never be decoded thus skipping unnecessary decoding. Next the decoding apparatus decodes a third media object in the media signal 300, and extracts location information 03 of the meta data from the third media object. The decoding apparatus determines whether the extracted location information 03 is identical to the previously extracted location information 01. The decoding apparatus determines that the meta data is updated since the extracted location information 03 is not identical to the previously extracted location information 01. Then the decoding apparatus accesses the meta data at a location corresponding to the extracted location information 03 based on the extracted location information 03. Thereafter the decoding apparatus decodes the accessed meta data, extract attribution information for the media object from the meta data, and then reproduce the media object by using the attribution information.

Figure 4:
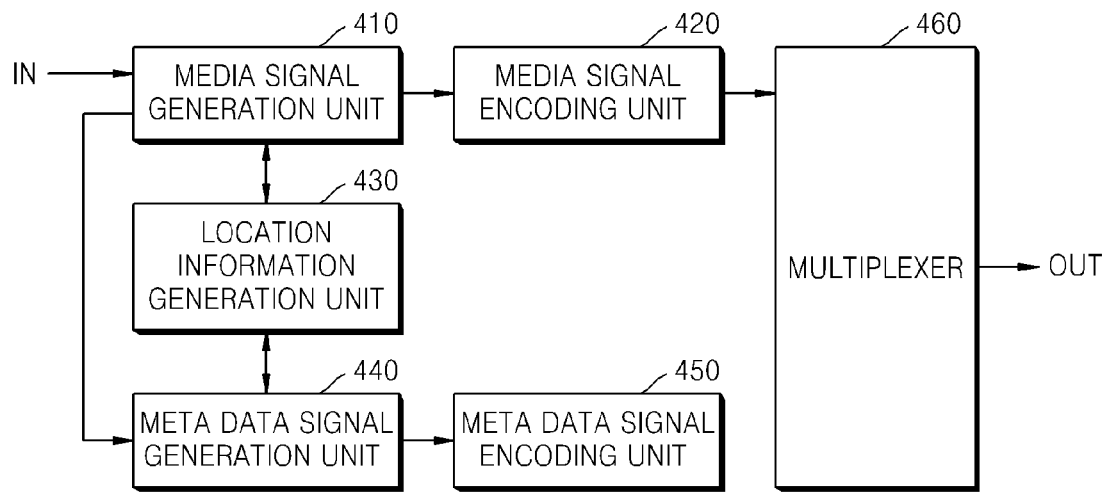
FIG. 4 is a block diagram of a meta data encoding apparatus according to an embodiment of the present invention.

FIG. 4 is a block diagram of an apparatus for encoding meta data according to an embodiment of the present invention. Referring to FIG. 4, the encoding apparatus includes a media signal generation unit 410, a media signal encoding unit 420, a location information generation unit 430, a meta data signal generation unit 440, a meta data signal encoding unit 450 and a multiplexer 460. The encoding apparatus allocates unique location information to meta data so that whether the meta data has been updated or is not changed can be easily determined.

The media signal generation unit 410 generates a media signal, such as an audio signal or a video signal. The media signal encoding unit 420 encodes the media signal and transmits it to the multiplexer 460. The meta data signal generation unit 440 generates meta data corresponding to each of media objects contained in the media signal. The meta data signal generation unit 440 generates a meta data signal by arranging each of a plurality of pieces of the meta data in a specific location. The meta data contains various profile information, such as the attributes and manufacturing date of the media signal, and information for decoding the media signal.

The location information generation unit 430 respectively receives the media signal and the meta data signal from the media signal generation unit 410 and the meta data signal generation unit 440, determines meta data corresponding to each of media objects contained in the media signal, and then generates location information indicating the location of each pieces of the meta data. As described above, the location information of the meta data enables the meta data to be identified. The location information generation unit 430 transmits the generated location information to the media signal generation unit 410 and the meta data signal generation unit 440. The media signal generation unit 410 generates a media signal by inserting the location information received from the location information generation unit 430 into the respective media objects.

The meta data signal encoding unit 450 encodes the meta data signal generated by the meta data signal generation unit 440 and transmits the encoded meta data signal to the multiplexer 460. The multiplexer 460 transforms the encoded media signal and meta data signal in the form of a packet, mixes the packets together, and transmits the mixed packets to a decoding apparatus (not shown).

Figure 5:
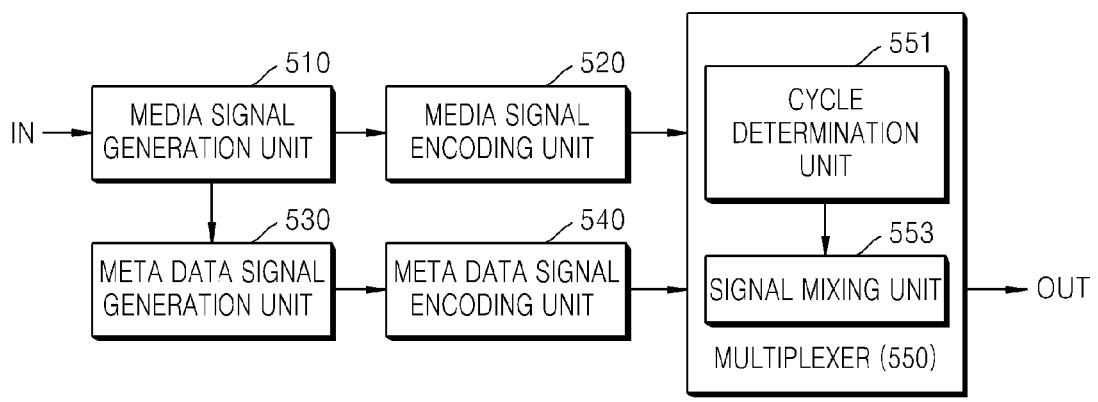
FIG. 5 is a block diagram of a meta data encoding apparatus according to another embodiment of the present invention.

FIG. 5 is a block diagram of an apparatus for encoding meta data according to another embodiment of the present invention. Referring to FIG. 5, the encoding apparatus includes a media signal generation unit 510, a media signal encoding unit 520, a meta data signal generation unit 530, a meta data signal encoding unit 540, and a multiplexer 550. The media signal generation unit 510 generates a media signal and transmits the media signal to the media signal encoding unit 520. The media signal encoding unit 520 encodes the media signal and transmits the encoded media signal to the multiplexer 550. The meta data signal generation unit 530 generates a meta data signal corresponding to the media signal and transmits the meta data signal to the meta data signal encoding unit 540. The meta data signal encoding unit 540 encodes the meta data signal and transmits the encoded meta data signal to the multiplexer 550. The multiplexer 550 transforms the encoded media signal and meta data signal that are respectively received from the media signal encoding unit 520 and the meta data signal encoding unit 540, so that they can be transmitted. The multiplexer 550 transforms data contained in the media signal and the meta data signal in the form of a packet, mixes the packets together, and transmits the mixed packets to a decoding apparatus (not shown).

As described above, according to the present invention, version information or location information given to meta data may be used in order to determine whether the meta data is not changed. The encoding apparatus illustrated in FIG. 5 changes a cycle of insertion of the meta data packet so that the decoding apparatus can determine whether the meta data is not changed or whether the version information of the meta data has been updated by using the version information. To this end, the multiplexer 550 of the encoding apparatus illustrated in FIG. 5 includes a cycle determination unit 551 and a signal mixer 553. The cycle determination unit 551 determines a cycle of transmitting the meta data packet by determining a ratio at which the meta data packet, audio packets and video packets are mixed together in order to indicate whether the meta data is not changed, that is, whether the meta data has been updated by changing the version thereof. The cycle determination unit 551 allows the meta data packet to be inserted in a predetermined cycle if the version of the meta data is not changed, and the meta data packet to be inserted in a changed cycle if the version of the meta data is changed. The signal mixer 553 performs packet mixing using the cycle of insertion of the meta data packet, which is determined by the cycle determination unit 551. The signal mixer 553 generates a stream by inserting the meta data packet in the predetermined cycle if the version of the meta data is not changed, and a stream by inserting the meta data packet in a different cycle if the version is changed by updating. The signal mixer 553 transmits the generated stream to the decoding apparatus.

Figure 6:
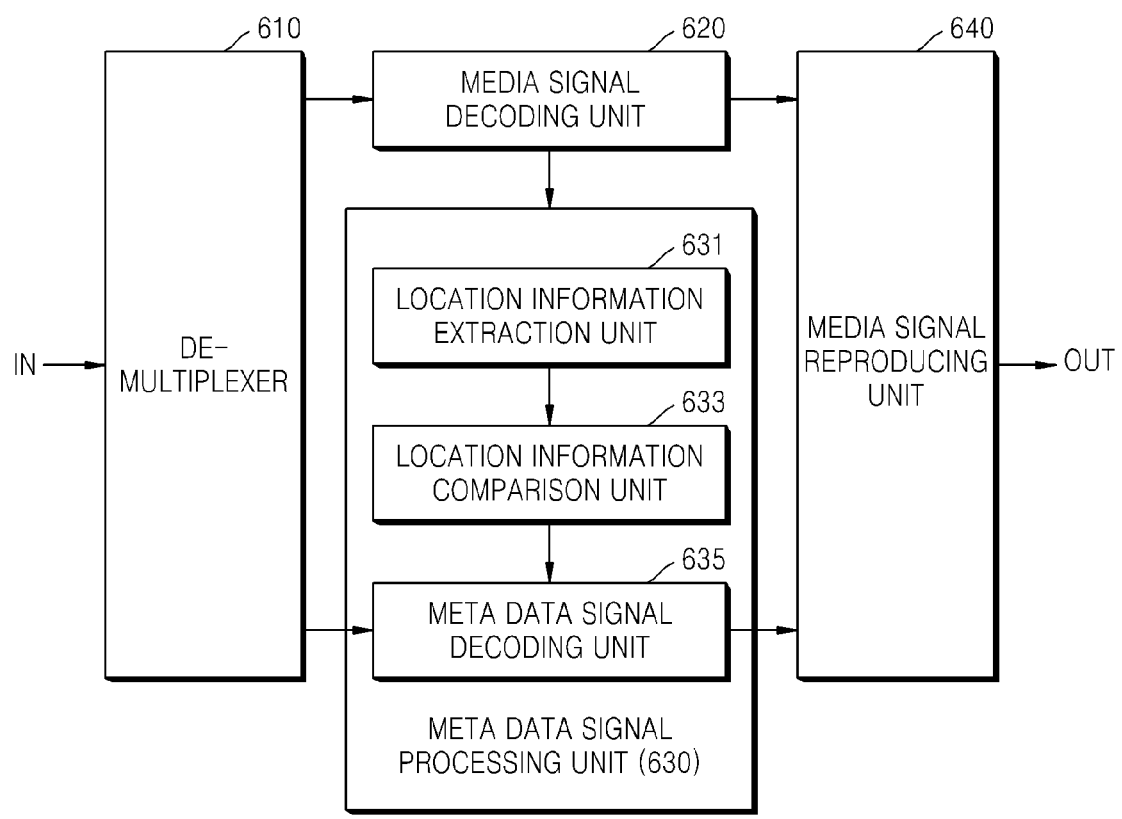
FIG. 6 is a block diagram of a meta data decoding apparatus according to an embodiment of the present invention.

FIG. 6 is a block diagram of an apparatus for decoding meta data according to an embodiment of the present invention. Referring to FIG. 6, the decoding apparatus includes a demultiplexer 610, a media signal decoding unit 620, a meta data signal processing unit 630 and a media signal reproducing unit 640. If unique location information is given to meta data, the decoding apparatus of FIG. 6 determines whether the meta data is not changed, using the unique location information.

The demultiplexer 610 parses an encoded media signal and a meta data signal received from an encoding apparatus (not shown), and respectively transmits the media signal and the meta data signal to the media signal decoding unit 620 and the meta data signal processing unit 630. The media signal decoding unit 620 decodes the media signal and transmits the decoded media signal to the media signal reproducing unit 640.

The meta data signal processing unit 630 includes a location information extraction unit 631, a location information comparison unit 633 and a meta data signal decoding unit 635. The location information extraction unit 631 extracts location information from media objects included in the media signal. The location information extraction unit 631 transmits the extracted location information to the location information comparison unit 633.

The location information comparison unit 633 stores the extracted location information received from the location information extraction unit 631. If receiving the location information of the new meta data from the location information extraction unit 631, the location information comparison unit 633 compares the stored location information with location information of the new meta data. The location information comparison unit 633 transmits the result of comparison to the meta data signal decoding unit 635. If the stored location information is not identical to the location information of the new meta data, the location information comparison unit 633 transmits the location information of the new meta data to the meta data signal decoding unit 635. The meta data signal decoding unit 635 determines whether to decode the meta data signal according to the result of comparison. If the location information of the meta data corresponding to the media object that is currently decoded by the media signal decoding unit 620 is not identical to location information of meta data corresponding to an already decoded media object, the meta data signal decoding unit 635 accesses and decodes the meta data corresponding to the media object that is currently decoded. The meta data signal decoding unit 635 transmits the decoded meta data to the media signal reproducing unit 640. The media signal reproducing unit 640 reproduces the media signal by using the decoded media signal and meta data signal received from the media signal decoding unit 620 and the meta data signal decoding unit 635.

If the location information of the meta data corresponding to a media object that is currently decoded by the media signal decoding unit 620 is identical to the location information of already decoded meta data, the meta data signal decoding unit 635 skips decoding of the meta data having the same location information. That a plurality of pieces of meta data having the same location information is understood that the pieces of the meta data are identical to each other, and therefore, it is unnecessary to decode meta data whose version is the same as that of the already decoded meta data. Accordingly, it is possible to prevent unnecessary operation from being performed by skipping redundant decoding.

Figure 7:
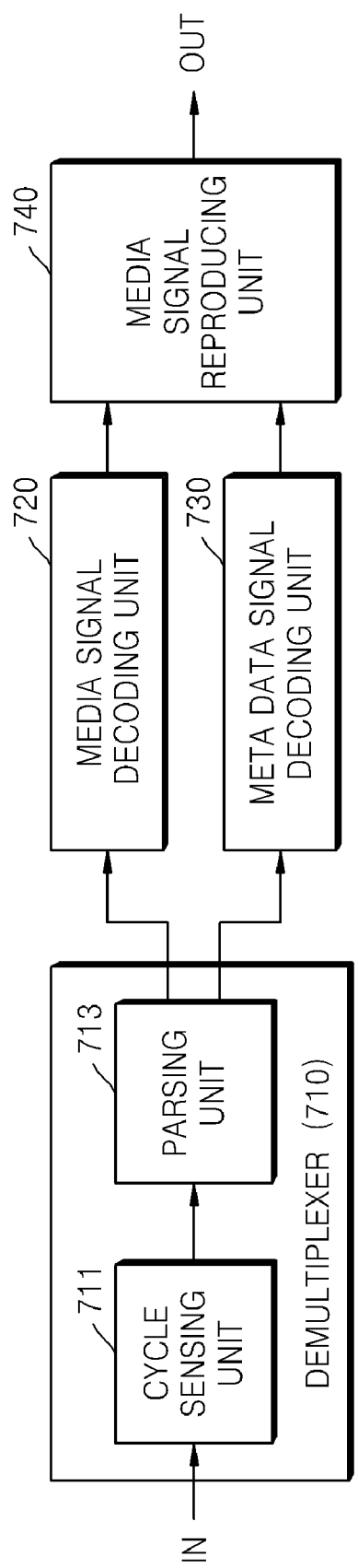
FIG. 7 is a block diagram of a meta data decoding apparatus according to another embodiment of the present invention.

FIG. 7 is a block diagram of an apparatus for decoding meta data according to another embodiment of the present invention. Referring to FIG. 7, the decoding apparatus includes a demultiplexer 710, a media signal decoding unit 720, a meta data signal decoding unit 730 and a media signal reproducing unit 740. The decoding apparatus determines whether the meta data has been updated by using a cycle in which a meta data packet has been inserted into a stream transmitted from an encoding apparatus (not shown). To this end, the demultiplexer 710 includes a cycle sensing unit 711 and a parsing unit 713.

The cycle sensing unit 711 senses the cycle of the meta data packet being mixed together with the stream. The cycle sensing unit 711 stores the information regarding the meta data packet cycle, and determines whether a newly sensed meta data packet cycle is the same as the stored meta data packet cycle. The parsing unit 713 parses media signal packets, such as an audio packet and a video packet, transmits the parsed media signal packets to the media signal decoding unit 720, parses a meta data packet, and then transmits the parsed media data packets to the meta data signal decoding unit 730. The media signal decoding unit 720 decodes the media signal received from the parsing unit 713 and transmits the decoded media signal to the media signal reproducing unit 740. The parsing unit 713 determines whether the meta data packet must be parsed or not using the meta data packet cycle sensed by the cycle sensing unit 711. If the meta data packet cycle is changed, it means that the version information of the meta data is updated and thus the parsing unit 713 parses the meta data packet and transmits the parsed meta data packet to the meta data signal decoding unit 730. The meta data signal decoding unit 730 receives the meta data signal from the parsing unit 713 and transmits it to the media signal reproducing unit 740. If the meta data packet cycle is the same as a previous cycle, it means that the meta data is not changed and thus the parsing unit 713 does not parse the meta data packet. The meta data signal decoding unit 730 need not repeatedly decode meta data having the same version information since the parsing unit 713 does not parse meta data having the same meta data packet cycle. The media signal reproducing unit 740 reproduces the media signal by using the decoded media signal and the decoded meta data signal received from the media signal decoding unit 720 and the meta data signal decoding unit 730.

Figure 8:
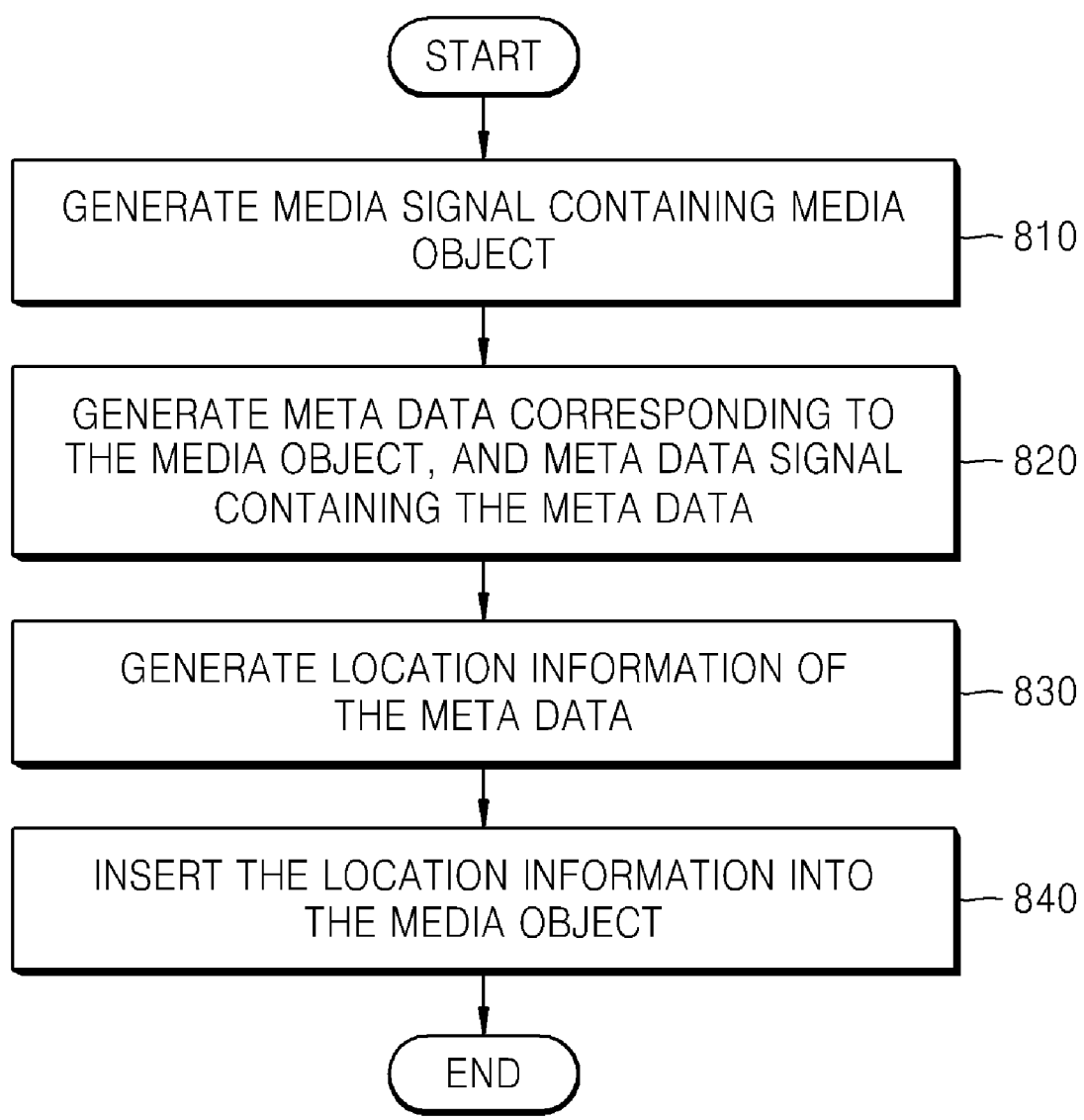
FIG. 8 is a flowchart illustrating a meta data encoding method according to an embodiment of the present invention.

FIG. 8 is a flowchart illustrating a method of encoding meta data according to an embodiment of the present invention. Referring to FIG. 8, a meta data encoding apparatus according to an embodiment of the present invention generates a media signal containing media objects (operation 810). Next, the meta data encoding apparatus generates meta data corresponding to the respective media objects, and a meta data signal containing a plurality of meta data signals (operation 820). The meta data encoding apparatus generates location information of the meta data corresponding to the respective media objects by using the media signal and the meta data signals (operation 830). Then the meta data encoding apparatus respectively inserts a plurality of pieces of the location information into the media objects (operation 840). Thereafter the meta data encoding apparatus encodes the media signal and the meta data signals and mixes them together.

Figure 9:
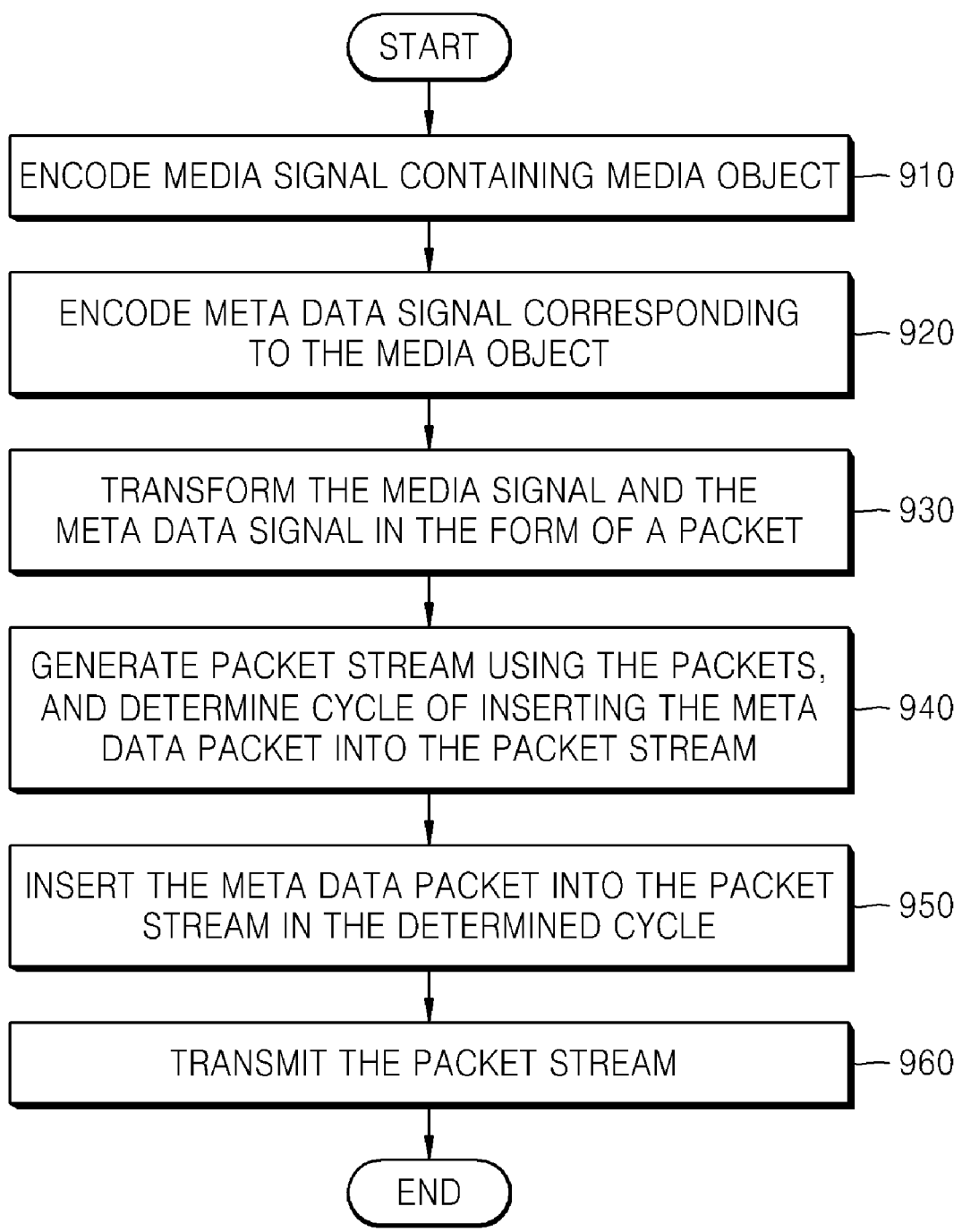
FIG. 9 is a flowchart illustrating a meta data encoding method according to another embodiment of the present invention.

FIG. 9 is a flowchart illustrating a method of encoding meta data according to another embodiment of the present invention. Referring to FIG. 9, a meta data encoding apparatus according to an embodiment of the present invention generates and encodes a media signal containing a media object (operation 910). The meta data encoding apparatus generates a meta data signal corresponding to the media object and encodes the meta data signal (operation 920). The meta data encoding apparatus transforms the media signal and the meta data signals in the form of a packet (operation 930). The meta data encoding apparatus generates a packet stream using the packets, and determines a cycle of inserting the meta data packet into the packet stream (operation 940). Next the meta data encoding apparatus generates a stream by inserting a meta data packet into the packet stream in the determined cycle (operation 950), and then transmits the stream to a decoding apparatus (not shown) (operation 960).

Figure 10:
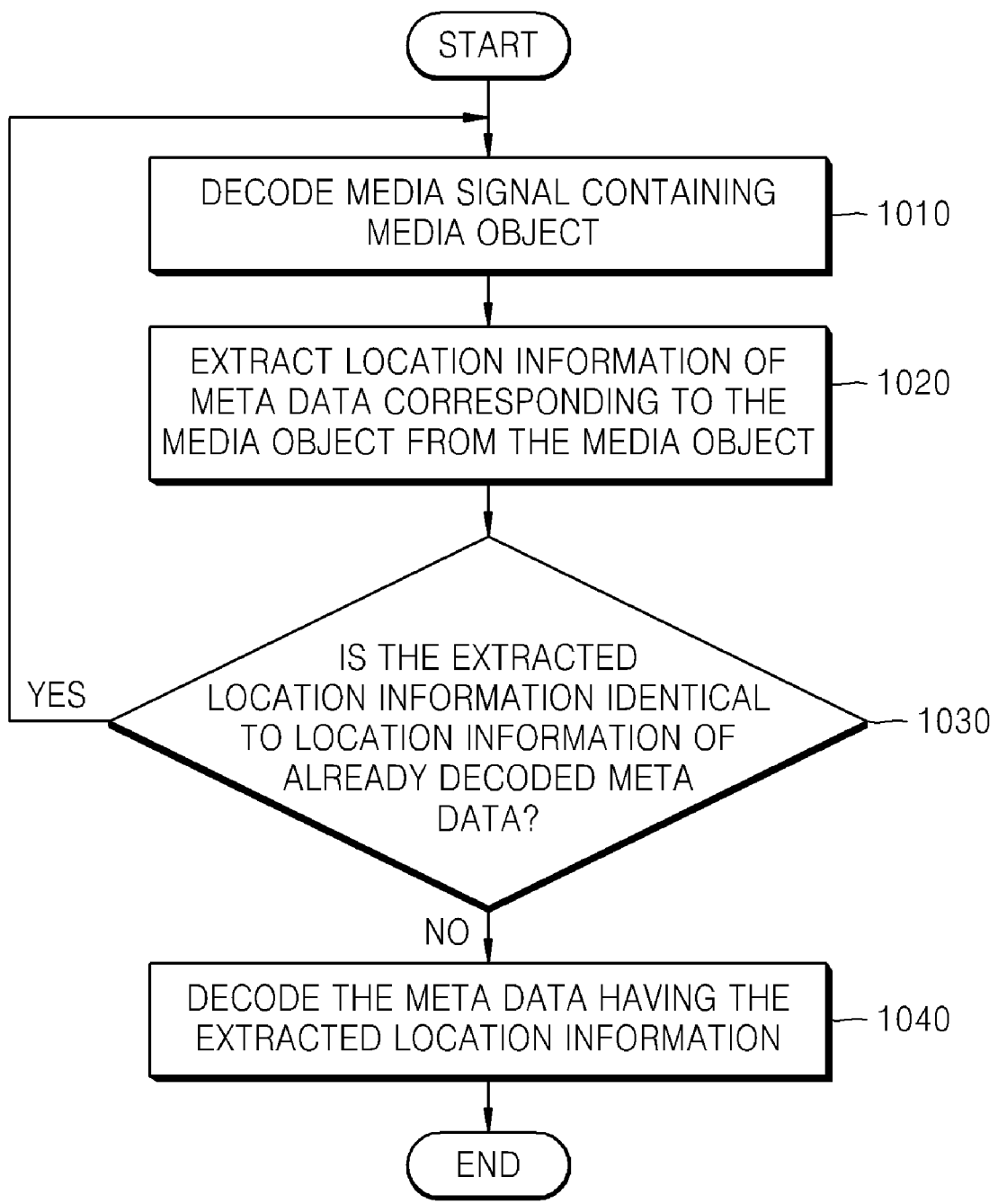
FIG. 10 is a flowchart illustrating a meta data decoding method according to an embodiment of the present invention.

FIG. 10 is a flowchart illustrating a method of decoding meta data according to an embodiment of the present invention. Referring to FIG. 10, a meta data decoding apparatus according to an embodiment of the present invention decodes a media signal containing a media object (operation 1010). The meta data decoding apparatus extracts location information of meta data corresponding to the media object from the media object (operation 1020). The meta data decoding apparatus determines whether the extracted location information is identical to location information of already decoded meta data (operation 1030). If the extracted location information is not identical to the location information of the already decoded meta data, the meta data decoding apparatus decodes the meta data of the extracted location information (operation 1040). If the extracted location information is identical to the location information of the already decoded meta data, the meta data decoding apparatus skips decoding of the meta data of the extracted location information. Thus it is possible to prevent an unnecessary operation from being performed by skipping redundant decoding of the same meta data, thereby reducing the complexity of the decoding apparatus.

Figure 11:
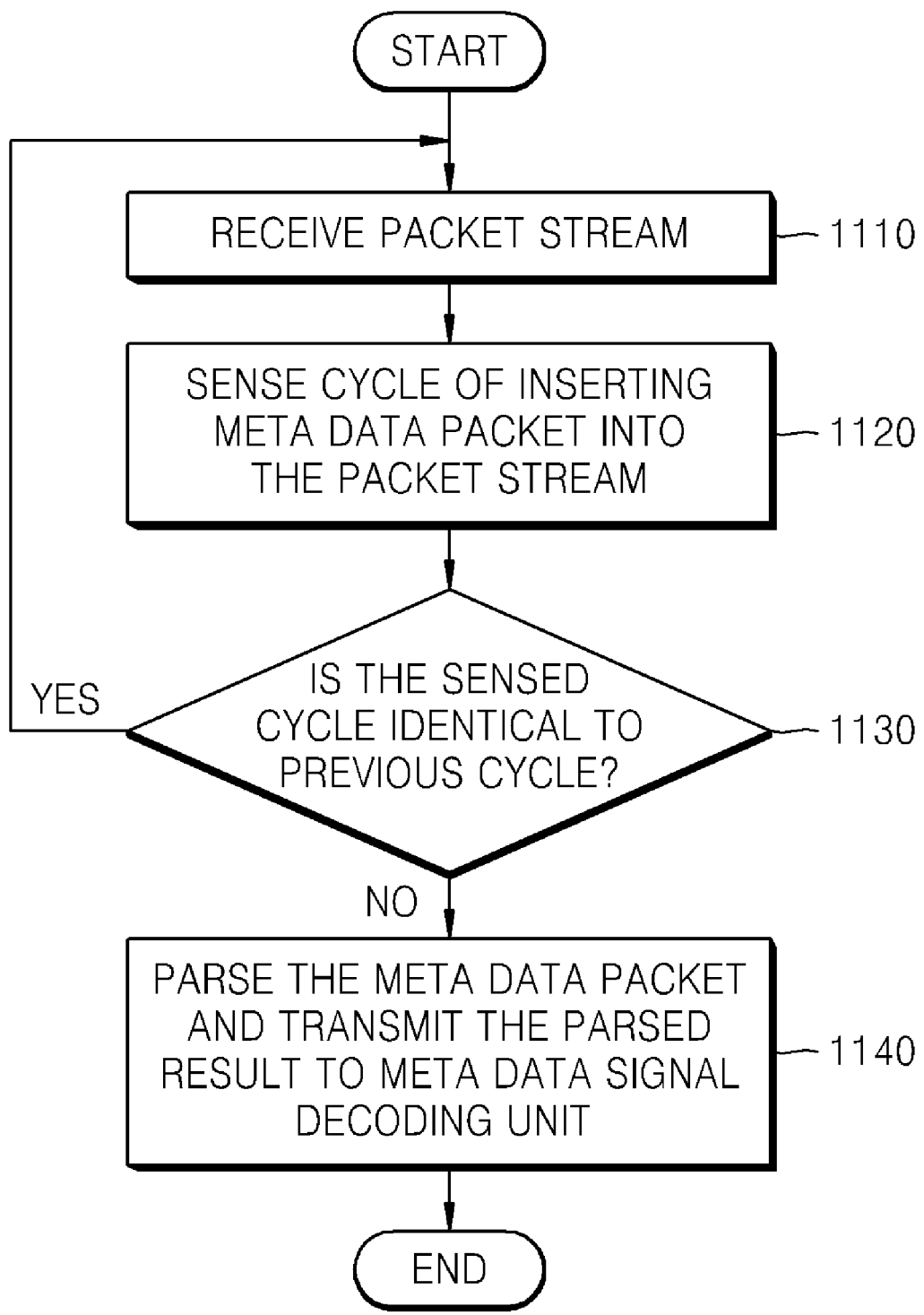
FIG. 11 is a flowchart illustrating a meta data decoding method according to another embodiment of the present invention.

FIG. 11 is a flowchart illustrating a method of decoding meta data according to another embodiment of the present invention. Referring to FIG. 11, a meta data decoding apparatus according to an embodiment of the present invention receives a packet stream (operation 1110). The meta data decoding apparatus senses a cycle in which a meta data packet has been inserted into the packet stream (operation 1120). The meta data decoding apparatus determines whether the sensed cycle is identical to a previous cycle (operation 1130). If the sensed cycle is not identical to the previous cycle, the meta data decoding apparatus parses the meta data packet and transmits the parsed meta data packet to the meta data signal decoding unit (operation 1140). In this case, the meta data decoding apparatus decodes the meta data signal packet. If the sensed cycle is identical to the previous cycle, the meta data decoding apparatus does not parse the meta data packet. Also, in this case, the meta data decoding apparatus also does not decode the meta data signal. Accordingly, if a packet cycle is identical to a previous cycle, the same meta data is not repeatedly decoded thus reducing the complexity of a decoding operation.

The present invention provides an encoding/decoding method and apparatus capable of determining whether meta data has been updated or whether meta data is not changed without decoding the meta data.

The present invention also provides an encoding method and apparatus for determining whether meta data has been updated or whether meta data is not changed by using either a cycle of inserting a meta data packet into a transmission stream or unique location information of the meta data.

The present invention also provides a decoding method and apparatus for determining whether meta data has been updated or whether meta data is not changed by using either a cycle of inserting a meta data packet into a transmission stream or unique location information of the meta data.

The present invention also provides an encoding/decoding method and apparatus and a data structure for preventing the same meta data from being redundantly decoded by determining whether the meta data has been updated or whether the meta data is not changed, and a computer readable medium having recorded thereon a program for executing the method.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of decoding meta data, comprising:

receiving a stream in which a media signal packet containing a media object and meta data packet corresponding to the media object are mixed together; and parsing from the stream, the media signal packet;

wherein the meta data packet is inserted into the stream in a predetermined cycle, and the parsing from the stream comprises determining whether the predetermined cycle is identical to a previous cycle and parsing the meta data packet, if the predetermined cycle is not identical to the previous cycle.

2. The method of claim 1, wherein the parsing of the meta data packet is not performed if the predetermined cycle is identical to a previous cycle.

* * * * *